US010823510B2

(12) United States Patent
Chordia et al.

(10) Patent No.: US 10,823,510 B2
(45) Date of Patent: *Nov. 3, 2020

(54) COUNTERCURRENT HEAT EXCHANGER/REACTOR

(71) Applicant: Thar Energy LLC, Pittsburgh, PA (US)

(72) Inventors: Lalit Chordia, Pittsburgh, PA (US); John C. Davis, Pittsburgh, PA (US)

(73) Assignee: Thar Energy LLC, Pittsburgh, PA (US)

( * ) Notice: Subject to any disclaimer, the term of this patent is extended or adjusted under 35 U.S.C. 154(b) by 50 days.

This patent is subject to a terminal disclaimer.

(21) Appl. No.: 16/234,170

(22) Filed: Dec. 27, 2018

(65) Prior Publication Data
US 2019/0128612 A1    May 2, 2019

Related U.S. Application Data

(60) Continuation of application No. 15/687,645, filed on Aug. 28, 2017, now Pat. No. 10,557,669, which is a
(Continued)

(51) Int. Cl.
*F28D 7/02* (2006.01)
*F28D 7/16* (2006.01)
(Continued)

(52) U.S. Cl.
CPC ............ *F28D 7/1607* (2013.01); *B01J 8/087* (2013.01); *B01J 19/006* (2013.01);
(Continued)

(58) Field of Classification Search
CPC .... F28D 7/1684; F28D 7/1607; F28D 7/1653; B01J 19/0093; B01J 18/087;
(Continued)

(56) References Cited

U.S. PATENT DOCUMENTS 9,777,965 B2 * 10/2017 Chordia ................ F28D 7/1684
10,557,669 B2 * 2/2020 Chordia ............... B01J 19/0093
(Continued)

FOREIGN PATENT DOCUMENTS

| DE | 243091 A1 | 2/1987 |
| EP | 2972043 A2 | 1/2016 |
| WO | 1994/010520 A1 | 5/1994 |

OTHER PUBLICATIONS

International Search Report for PCT/US14/24108 dated Sep. 25, 2014 p. 1-5.
(Continued)

*Primary Examiner* — Davis D Hwu
(74) *Attorney, Agent, or Firm* — Womble Bond Dickinson (US) LLP; Deborah M. Vernon; Heath T. Misley

(57) ABSTRACT

Counter-flow heat exchanged is constructed with plenums at either end that separate the opposing fluids, the channels of which are arrayed in a checkerboard patterns, such that any given channel is surrounded by channels of opposing streams on four sides—laterally on both sides and vertically above and below.

9 Claims, 10 Drawing Sheets

Related U.S. Application Data division of application No. 14/770,612, filed as application No. PCT/US2014/027108 on Mar. 14, 2014, now Pat. No. 9,777,965.

(60) Provisional application No. 61/789,235, filed on Mar. 15, 2013.

(51) Int. Cl.
*B01J 8/08* (2006.01)
*B01J 19/00* (2006.01)
*B01J 19/24* (2006.01)
*F28F 9/02* (2006.01)

(52) U.S. Cl.
CPC ......... *B01J 19/0093* (2013.01); *B01J 19/249* (2013.01); *B01J 19/2425* (2013.01); *F28D 7/1653* (2013.01); *F28D 7/1684* (2013.01); *F28F 9/02* (2013.01); *B01J 2219/0086* (2013.01); *B01J 2219/00788* (2013.01); *B01J 2219/00822* (2013.01); *B01J 2219/00835* (2013.01); *B01J 2219/00849* (2013.01); *B01J 2219/00873* (2013.01); *B01J 2219/00891* (2013.01); *B01J 2219/1921* (2013.01); *B01J 2219/1928* (2013.01); *B01J 2219/2462* (2013.01); *B01J 2219/2477* (2013.01); *B01J 2219/2485* (2013.01); *F28F 2260/02* (2013.01)

(58) Field of Classification Search
CPC .... B01J 19/006; B01J 16/0093; B01J 9/2425; B01J 19/249; F28F 9/02
USPC ........................................................ 165/164
See application file for complete search history.

(56) References Cited

U.S. PATENT DOCUMENTS

| | | |
|---|---|---|
| 2005/0217837 A1 | 10/2005 | Kudija |
| 2006/0288602 A1 | 12/2006 | Lee et al. |
| 2007/0009426 A1 | 1/2007 | Leveson |
| 2012/0210581 A1 | 8/2012 | Wallaert et al. |
| 2012/0261139 A1 | 10/2012 | Williamson, Jr. et al. |
| 2015/0233191 A1 | 8/2015 | Williamson, Jr. et al. |

OTHER PUBLICATIONS

European Search Report for 14771083.4-1370 Dated Oct. 6, 2016 p. 1-8.

* cited by examiner

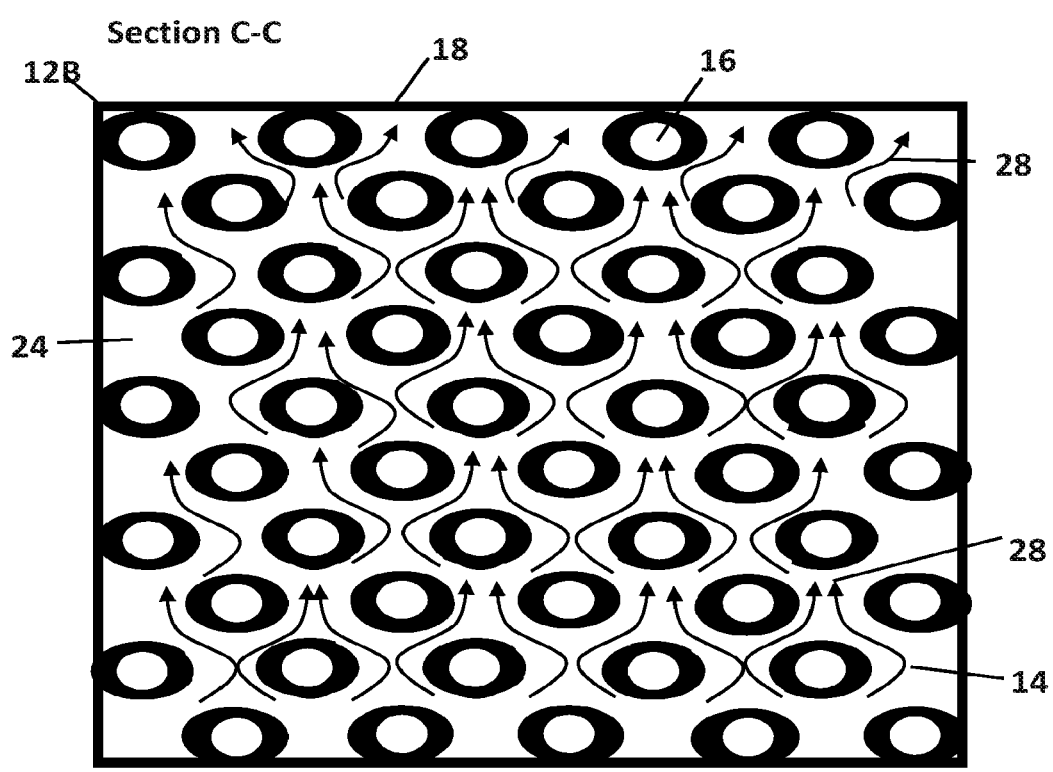

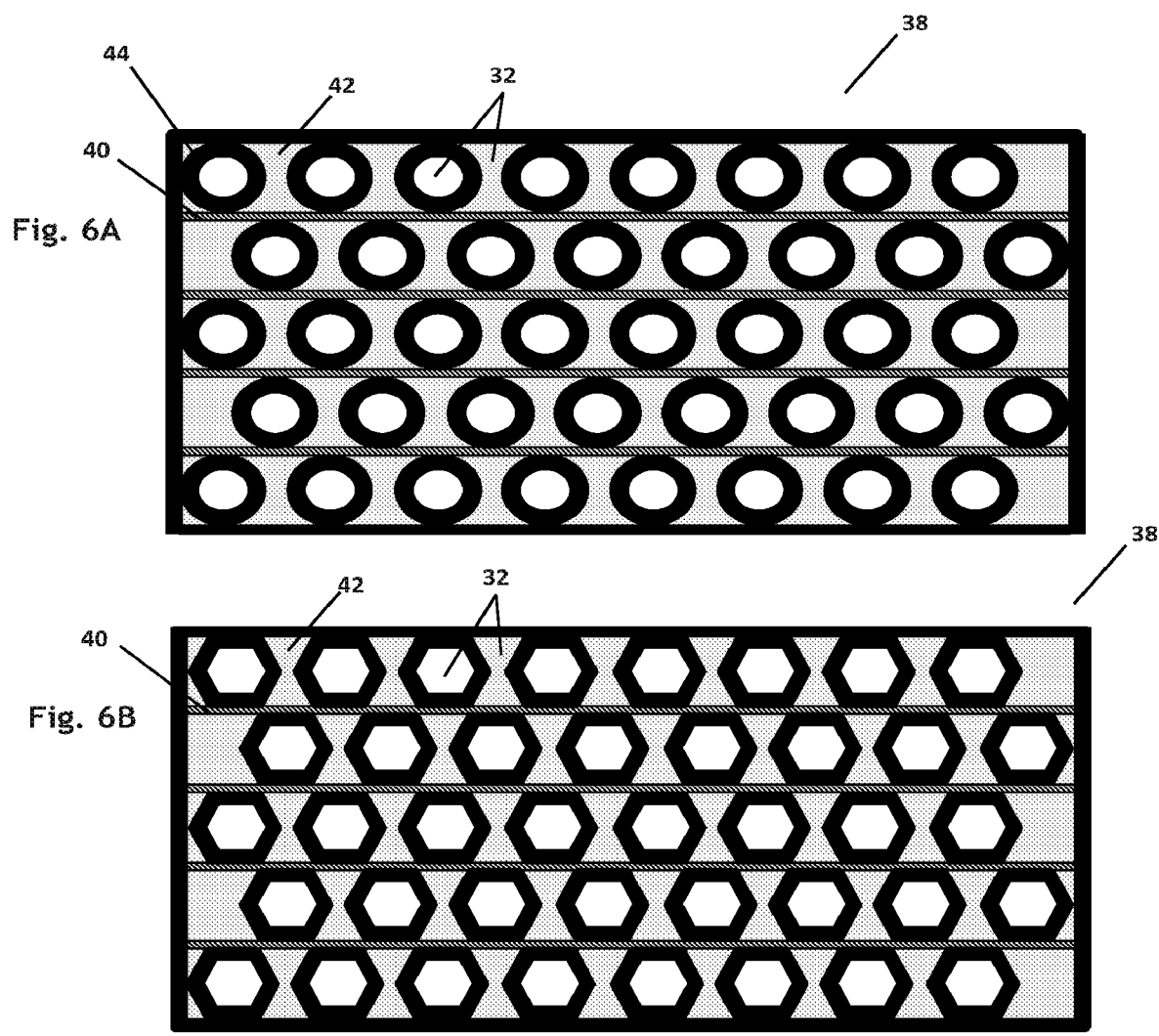

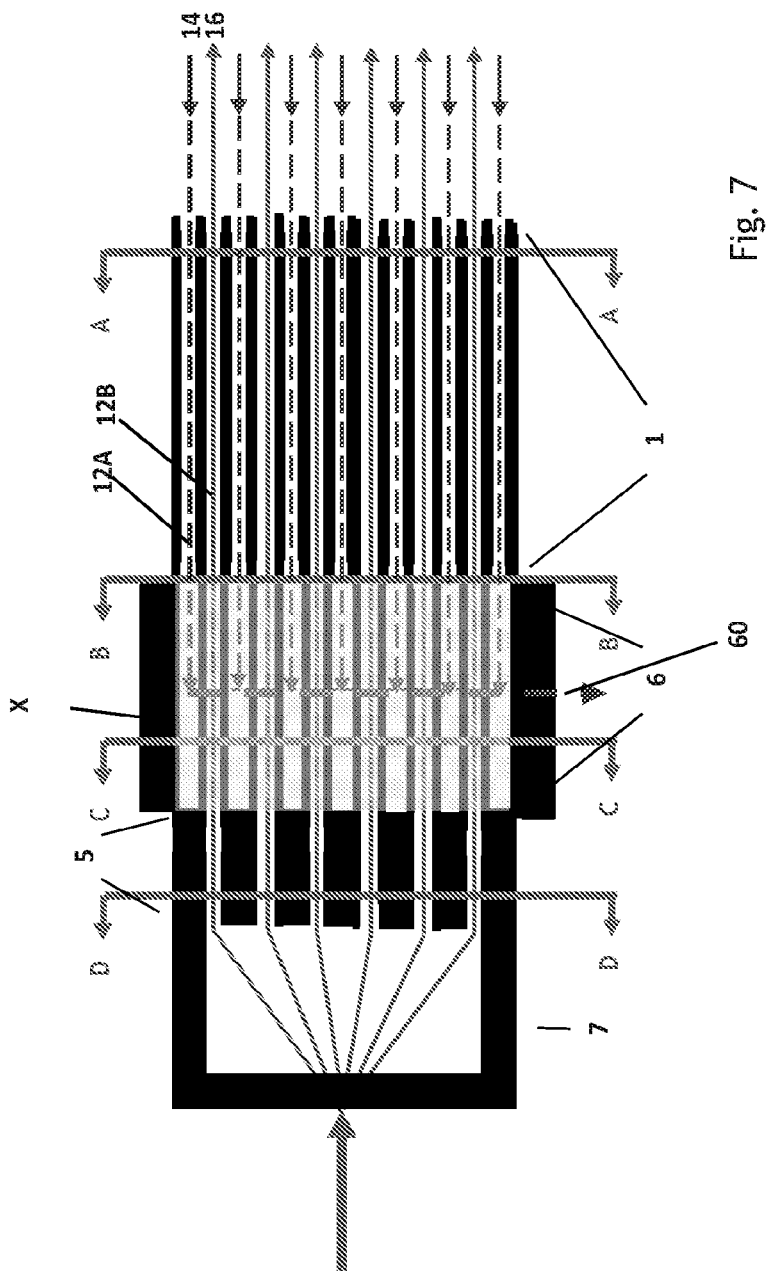

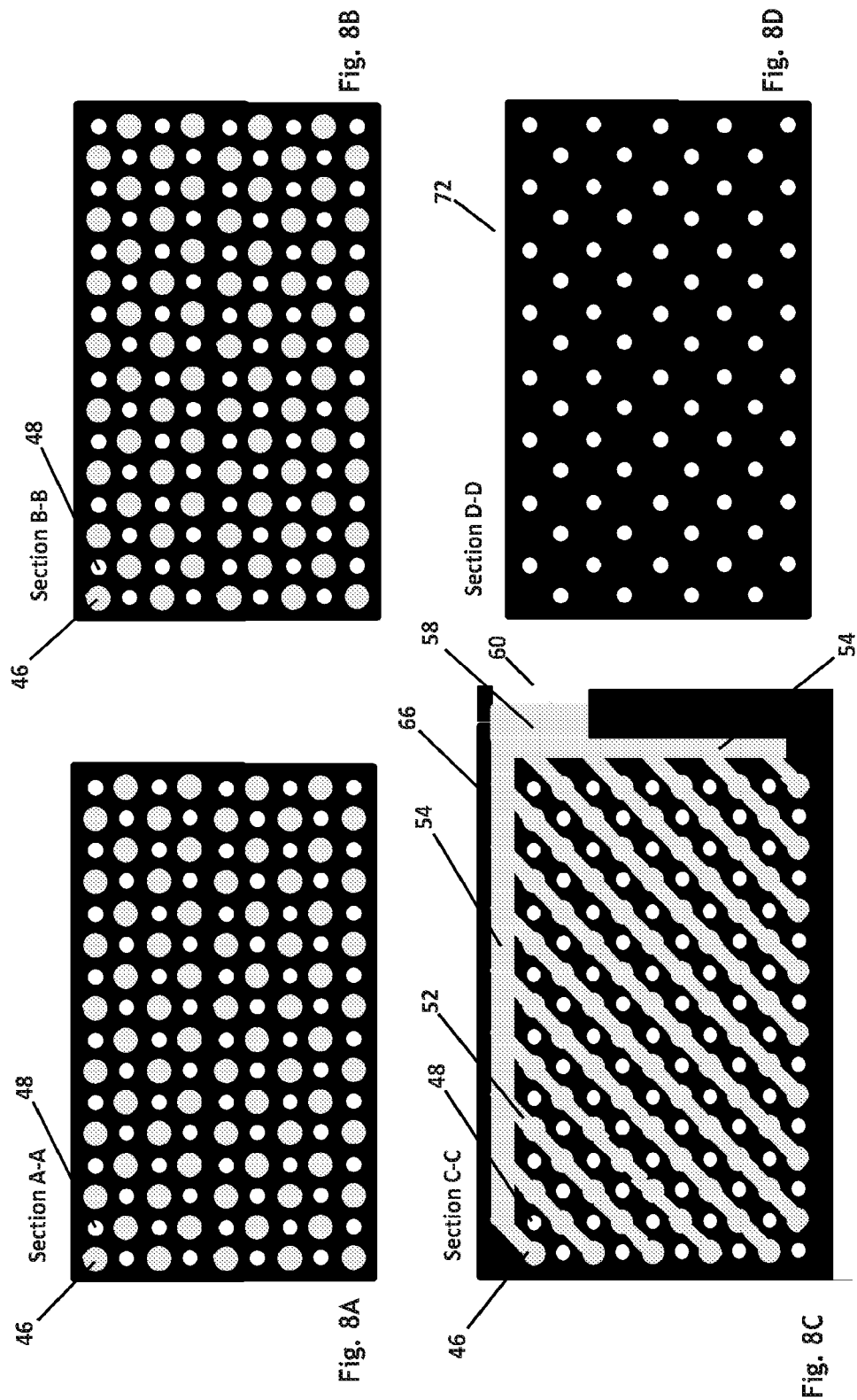

COUNTERCURRENT HEAT EXCHANGER/REACTOR

CROSS-REFERENCE TO RELATED APPLICATIONS

This application is a continuation of U.S. application Ser. No. 15/687,645 filed Aug. 28, 2017, which is a divisional of U.S. application Ser. No. 14/770,612 filed Aug. 26, 2015, which is a 35 U.S.C. § 371 National Stage Filing of International Application No. PCT/US2014/027108, filed Mar. 14, 2014, which claims benefit of and priority to U.S. Provisional Application No. 61/789,235 filed Mar. 15, 2013, the content of each of which is incorporated by reference herein in its entirety.

FIELD OF THE INVENTION

This invention relates to the field of single-pass countercurrent heat exchangers, more particularly, this invention related to such devices that exhibit high areal density.

BACKGROUND

It is well known that heat can be transferred between fluids within a given volume more efficiently as the size of the channels that conduct these fluids decreases and the number of channels increases. At channel dimensions that are considered by most as "microchannel" in size, meaning less than 5 millimeters and more likely less than 2 millimeters in diameter, design problems multiply rapidly. For example, header design, (i.e., separation of opposing streams) is one of the most challenging of problems. Especially in the case of countercurrent flow, it is difficult to maintain separation between opposing streams. The usual remedy has been to arrange the opposing streams in cross-flow configurations; i.e., one stream flowing in the X-direction, while the other flows in the Y-direction, so that their respective inlets and outlets are separated. A hybrid of the countercurrent and cross-flow design is the conventional shell-and-tube heat exchanged with baffles including those of multi-pass and serpentine configuration. The problem with these approaches, however, is that heat transfer efficiency suffers either from a poor pattern of temperature difference or flow distribution, or both. The ideal pattern is to arrange the channels in such a way that the hot stream enters from one end while the cold stream enters from the other, along the same axis, such as along the longitudinal axis of the exchanger. This is single-pass countercurrent flow with little or no cross-flow mixing of either stream.

In shell-and-tube heat exchangers, one stream enters the "tube side" via tubes that extend through a vessel that is filled with another fluid flowing generally in the opposite direction. The opposing fluid flows on the so-called "shell-side" of the heat exchanger. Typically, fluid enters the shell at the opposite end from the fluid entering the tube side. Tubes penetrate a "tube sheet" that contains the shell-side fluid within the vessel, thereby preventing shell-side fluid from leaking into headers that distribute the tube-side fluid to and from the tubes. Countercurrent flow is somewhat achieved in this configuration by ensuring that shell-side fluid flows outside the tubes in an opposite direction to the flow of fluid inside the tubes. However, flow is poorly distributed because of the introduction of the fluid via side ports. To improve flow distribution, internal baffles deflect flow along a serpentine rather than straight axial, path. This results in hybrid of counter-current and cross-flow, as previously described. Increasing the number of baffles, increases the degree of countercurrent flow and the associated heat transfer. This results in an increase in pressure drop as the number of baffles increases. However, there is a practical limit to the number of baffles that one can use.

The shell-and-tube configuration has been practiced at a microchannel level using hollow fibers that are typically spun from a polymeric melt. Squeezing the mass of fibers at either end achieves the same effect as a tube sheet. Heat exchangers of this type, however, are limited in both temperature and pressure. For high temperatures or pressure, typically metal channels and metal tube sheets are required. For microchannel heat exchangers the separation of the streams becomes more difficult because of the high density of channels penetrating the tube sheet. The usual remedy is to resort to a parallel-plate configuration in which opposing streams flow through alternating layers. For example, small microchannels can be achieved by etching or stamping a channel pattern into a thin plate and then bonding that plate to another smooth plate. Depending on the depth of the microchannel, the plates can be bonded by either brazing or diffusion bonding. The use of small microchannels improves efficiency in a compact design, but the device may be heavy due to the space taken up by solid, unetched metal underneath the channels.

SUMMARY OF THE INVENTION

The present invention discloses a method of heat transfer between two fluids streaming in a single-pass countercurrent flow, wherein the opposing streams are arranged in a bundle such that they exchange heat in four directions, laterally on both sides, above and below. At either end of the bundle one of the opposing streams remains confined within closed channels that penetrate an open plenum area while the other opposing stream is free to flow into the plenum area and between the confining channels of the first stream. Also at either end of the bundle the confined stream enters or exits through a cavity that is distinct from the plenum area. The plenum area is positioned between the bundle and the cavity through which the confined stream flows. As the cross sectional area of the tube decreases, the areal density of the channel bundle increases. For example, channel dimensions in the microchannel range (less than 5 millimeters) are needed to achieve areal densities greater than 400 $m^2/m^3$ (total heat-transfer surface area as a ratio of overall volume). The heat transfer coefficient of at least one of the opposing streams can be preferably enhanced by any of means that are known to increase flow turbulence, such that the heat transfer coefficients of both streams are within one order of magnitude of each other. That is, in some embodiments, modification, alterations and/or additions to the channels (e.g., roughening of channels walls, modification of interior shape of the channel, addition of porous media within the channel, etc.) can be made to some portion of the channels to increase turbulence therein.

Also disclosed is a method of chemical reaction and simultaneous heat transfer between two streams in countercurrent flow, but with the at least one of the opposing streams undergoing chemical reaction within the channel bundle. One of the opposing streams provides energy to the other stream.

Also disclosed is a device composed of channels arranged for countercurrent flow, wherein fluids flow in opposite directions through a bundle of channels whereby the opposing streams of fluid are arranged in a checkerboard pattern, such that for any given channel there exist alongside, in four directions, laterally on both sides, above and below, channels containing the opposite fluid. At either end of the bundle, channels confine one of the opposing streams through the plenum area and extend into a cavity through which the stream enters or exits the device by ports that are in the cavity wall. The channels that continue through the plenum may be modified in size and shape so as to allow fluid from the other opposing stream to flow around them to or from ports that are in the plenum wall. The heat transfer coefficient is enhanced by one or more means including: increased surface roughness of the channel walls; fins extending from channel walls; porous media that is fixed within channels This device may be formed by a first set of half-checkerboard channels in the shape of a hollow polygon of no more than four sides, while complementary half-checkerboard pattern takes the form of the similar polygon both in shape and size.

Also disclosed is a device formed by a first set of half-checkerboard channels in the shape of a hollow polygon of no more than four sides, while complementary half-checkerboard pattern takes the form of the similar polygon in shape but not in size.

Also disclosed is a device formed by a first set of half-checkerboard channels in the shape of a hollow polygon of no more than four sides, while complementary half-checkerboard pattern takes the form of the polygon that is neither similar in size or shape or even take the shape of the voids created between the first set of channels.

Also disclosed is a device composed of channels similarly arranged for countercurrent flow, but with the difference that at least one set of the channels is blocked in the axial direction and redirected transversely to a collection zone along the side of said end, impervious to the enclosed cavity. Channels of the axially blocked set or sets travel diagonally between channels of the opposing set without intersecting them and terminate in a common header that forms area collection zone. The outer wall of this collection zone contains a port through which fluid can enter or exit the device. This heat transfer coefficient is similarly enhanced by one or more means including: increased surface roughness of the channel walls; fins extending from channel walls; porous media that is fixed within channels.

Embodiments of the present disclosure are directed to a countercurrent flow single pass heat exchanger. In some embodiment, the heat exchanger includes a bundle of channels, a first fluid receiving member and a second fluid receiving member. The bundle of channels includes a first plurality of channels and a second plurality of channels. Individual channels of the first plurality are arranged with respect to individual channels of the second plurality to form a checkerboard pattern substantially through a transversal cross-section of the bundle. The individual channels of the first plurality of channels are in fluid communication with first flowstream ports and individual channels of the second plurality of channels are in fluid communication with second flowstream ports, wherein the first flowstream ports are distinct from and not in fluid communication with the second flowstream ports. The bundle, the first fluid receiving member, and the second fluid receiving member are arranged such that the first fluid receiving member is positioned between the second fluid receiving member and an end of the bundle; and wherein the second plurality of channels extend pass the end of the bundle and through the first fluid receiving member. It is noted that the first plurality of channels extends through the bundle and is in fluid communication with a collection area of the first fluid receiving member. The collection area is fluidly connected to at least one of the first flowstream ports.

In another embodiment, the heat exchanger includes a bundle of channels, a first fluid receiving member and a second fluid receiving member. The bundle of channels includes a first plurality of channels and a second plurality of channels. Individual channels of the first plurality of channels are in fluid communication with first flowstream ports and individual channels of the second plurality of channels are in fluid communication with second flowstream ports. The first flowstream ports being distinct from and not in fluid communication with the second flowstream ports; wherein the individual channels of the first plurality are arranged with respect to the individual channels of the second plurality to exchange heat within an interior region of the bundle (i.e., any region which excludes an outer boundary/edge of the bundle) along a longitudinal axis of the bundle in four directions with respect to each channel without mixing the first and second streams. The four directions includes above a selected channel in the interior region, below the selected channel, and along at least a portion of each lateral side of the selected channel. The bundle of channels, the first fluid receiving member and the second fluid receiving member are arranged such that the first fluid receiving member is positioned between the second fluid receiving member and an end of the bundle; wherein the second plurality of channels extends pass the end of the bundle and through the first fluid receiving member. It is noted that the first plurality of channels extends through the bundle and is in fluid communication with a collection area of the first fluid receiving member. The collection area being fluidly connected to at least one of the first flowstream ports.

Embodiments of the above heat exchangers can include one or more of the following features. In some embodiments, an areal density of the bundle of channels is greater than 400 $m^2/m^3$. In certain embodiments, at least a portion of the channels within the bundle of channels include walls with increased surface roughness. In some embodiments, at least a portion of the channels within the bundle of channels include fins extending from channel walls. Some embodiments also include porous media fixed within at least a portion of the channels. The porous media can increase turbulence. In some embodiments the porous media can be a catalyst for a reaction. Some embodiments include channels that have a modified or varying size and or shape. For example, in some embodiments, at least a portion of the second plurality of channels within the collection area have a different cross-section size and/or shape than within the bundle. In certain embodiments, a cross-sectional shape of individual channels of the first plurality of channels differs from a cross-sectional shape of individual channels of the second plurality of channels. In some embodiments, a cross-sectional area of individual channels of the first plurality of channels differs from a cross-sectional area of individual channels of the second plurality of channels. Other embodiments include channels formed at least in part with rows of elongate members. For example, in some embodiments, the second plurality of channels includes a plurality of elongate members spaced along a plurality of sheets to form rows of elongate members and the first plurality of channels comprises a plurality of voids, each of the voids being confined to form a channel by adjacent sheets within the plurality of sheets and by walls of two adjacent elongate members within rows of elongate members. Certain embodiments feature diagonal pathways. For example, in certain embodiments, the collection area is formed within a chamber defined by walls forming the first fluid receiving member; axial flow within the first fluid receiving member of the first plurality of channels is obstructed to force the first flowstream along diagonal pathways in fluid connection with the collection area. Some embodiments include a cavity for the collection of fluid from the second plurality of channels. The cavity is in fluid communication with at least one of the second flowstream ports and is defined by the second fluid receiving member.

Other embodiments of the present disclosure are directed to a method of manufacturing a bundle of channels for a heat exchanger. The method includes: additively manufacturing a first and second plurality of metal channels, wherein individual channels of the first plurality are arranged with respect to the individual channels of the second plurality to form a checkerboard pattern through a transversal cross-section of the bundle, the first and second plurality of channels being fluidly distinct, each of the channels of the second plurality of metal channels extending in length past an end of the first plurality of channels and at least one of size or shape of the transversal cross-sectional area of the individual channels of the second plurality changing along a longitudinal direction.

Embodiments of the above method of manufacturing can include one or more of the following features. In some embodiments, the first and second plurality of metal channels are additively manufactured out of (at least in part) Inconel. In other embodiments, the first and second plurality of metal channels are additively manufactured out of (at least in part) stainless steel. In certain embodiments, the heat exchanger is additively manufactured such that a wall thickness of the individual channels of the second plurality of channels increases along the longitudinal direction.

Other embodiments of the present disclosure are directed to a method of heat transfer between a first fluid stream and a second fluid stream in a countercurrent single pass heat exchanger. The method includes the following steps: (a) flowing the first fluid stream and the second fluid stream in a bundle of channels such that the first and second fluid streams flow countercurrently to each other to exchange heat within an interior region of the bundle along a longitudinal axis of the bundle in four directions with respect to an individual channel without mixing the first and second fluid streams, the four directions comprising above the individual channel, below the individual channel, and along at least a portion of each lateral side of the individual channel; (b) collecting the first fluid stream in a first fluid receiving member, the second fluid stream being confined within a plurality of channels extending through the first fluid receiving member to separate the first and second fluids; and (c) collecting the second fluid stream in a second fluid receiving member.

Embodiments of the above method of heat transfer can include one or more of the following features. In some embodiments, the above method can include an additional step of: increasing flow turbulence of the first fluid stream such that a heat transfer coefficient of the first flow stream is modified to a value which is within one order of magnitude of a heat transfer coefficient value of the second fluid stream. Some embodiments of the method include a chemical reaction. For example, in some embodiments, a chemical reaction occurs in the first fluid stream and the second fluid stream absorbs energy therefrom. In certain embodiments, a chemical reaction occurs in the first fluid stream and the second fluid stream provides thermal energy to the first fluid stream.

The above embodiments can include one or more of the following advantages. A heat exchanger of the type disclosed herein is useful in many different applications that demand compactness; i.e., high rates of heat transfer in a small package. For example, in utility power generation, recuperators are often employed to recover heat from working fluid from a turbine exhaust and recycle that energy to working fluid that is being heated ahead of the turbine. In these applications, recuperation heat duties can be several times that of the power generated. Without a compact design, these recuperators could become much too large for economical feasibility. This technology is also applicable to heat exchangers that move heat in and out of phase-change materials (PCMs). By minimizing the boundaries of solid-liquid interfaces through the use of microchannels, heat transfer efficiency is maximized and working-fluid flow rates are minimized. This facilitates huge savings at several points around a power cycle—a smaller solar receiver, smaller compressor, smaller recuperator and less waste heat. The manufacturing technology disclosed herein will also extend the commercial applications of microchannel construction to air-to-air and air-to-steam heat exchangers, as might be encountered in waste heat applications.

BRIEF DESCRIPTION OF THE FIGURES

Embodiments of the present invention will now be described, by way of example only, with reference to the accompanying drawings for the purpose of illustrating the embodiments, and not for purposes of limiting the invention, wherein:

FIG. 1A includes a set of end caps, whereas in FIG. 1B, the end caps are removed to expose a separator plate.

FIG. 3E is an enlarged view showing the cross-sectional view of FIG. 3C.

FIGS. 4A-D illustrate different representative cross-sectional patterns (i.e., different checkerboard patterns), wherein size and shape of flow cross sectional areas between the complementary sets of channels forming the checkerboard pattern are similar.

FIGS. 6A and 6B are cross-sectional of two different embodiments in which the cross-sectional shape and size of two sets of channels forming a checkerboard pattern are different.

FIG. 7 is a cross-sectional illustration of another embodiment of one portion of a heat exchanger in accordance with the present disclosure.

FIGS. 8A, 8B, 8C, and 8D are cross-sectional views taken along lines A-A, B-B, C-C, and D-D of FIG. 7, respectively.

In FIG. 9A, the cross-sectional view is taken within a first stream fluid collection area. In FIG. 9B, the cross-sectional view shows both the fluid collection area of the first stream (from FIG. 9A) overlapped with a fluid receiving and distribution area for a second stream, which flows in the opposite direction from the first flow stream.

DETAILED DESCRIPTION OF THE INVENTION

Figure 1A:
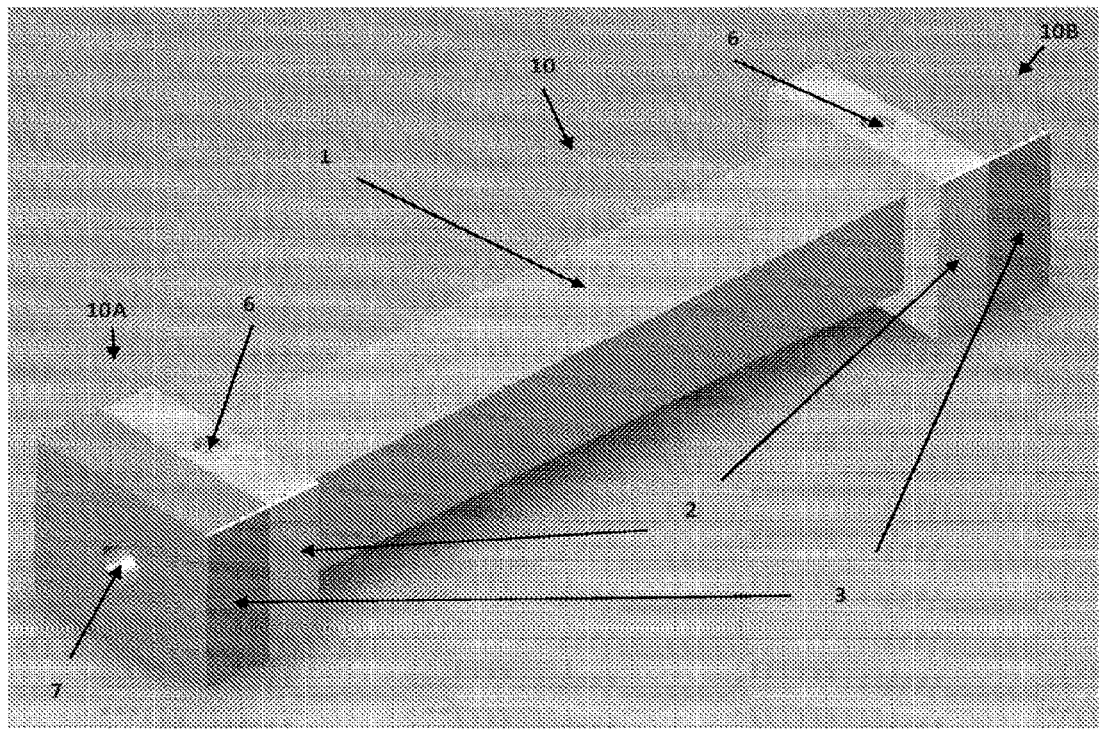
FIGS. 1A and 1B are perspective views of one embodiment of a heat exchanger in accordance with the present disclosure.
Figure 1B:
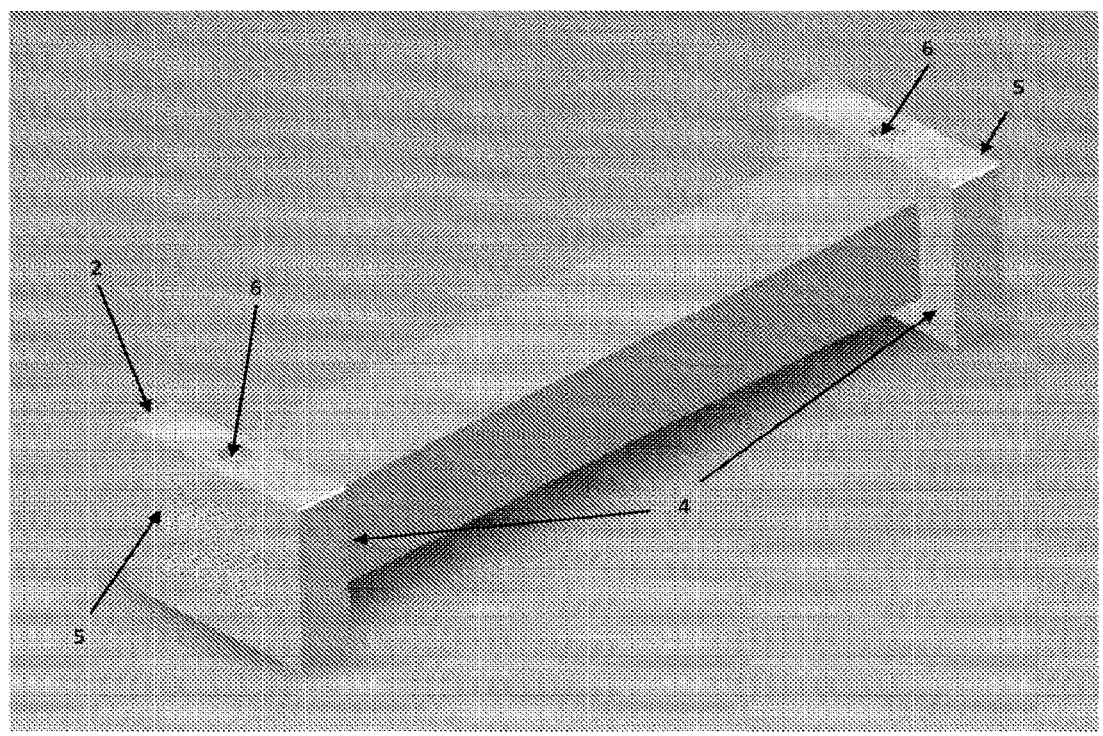

An illustration of an exemplary heat exchanger, heat exchanger 10, of the present invention is shown in FIGS. 1A and 1B. FIG. 1A shows the relationship of a channel bundle 1 to headers 2 and end caps 3. Specifically, the channel bundle 1 is positioned between the headers 2, which are disposed on each end of the channel bundle 1. End caps 3 are located adjacent to the headers 2. In FIG. 1B, the end caps 3 are removed to show openings within a separator plate 5 and to further identify terminal planes 4, which define the ends of the channel bundle 1. In general, heat exchangers in accordance with the present disclosure provide single-pass counter-current heat exchange between two opposing fluids which are kept separate from each other.

Figure 2:
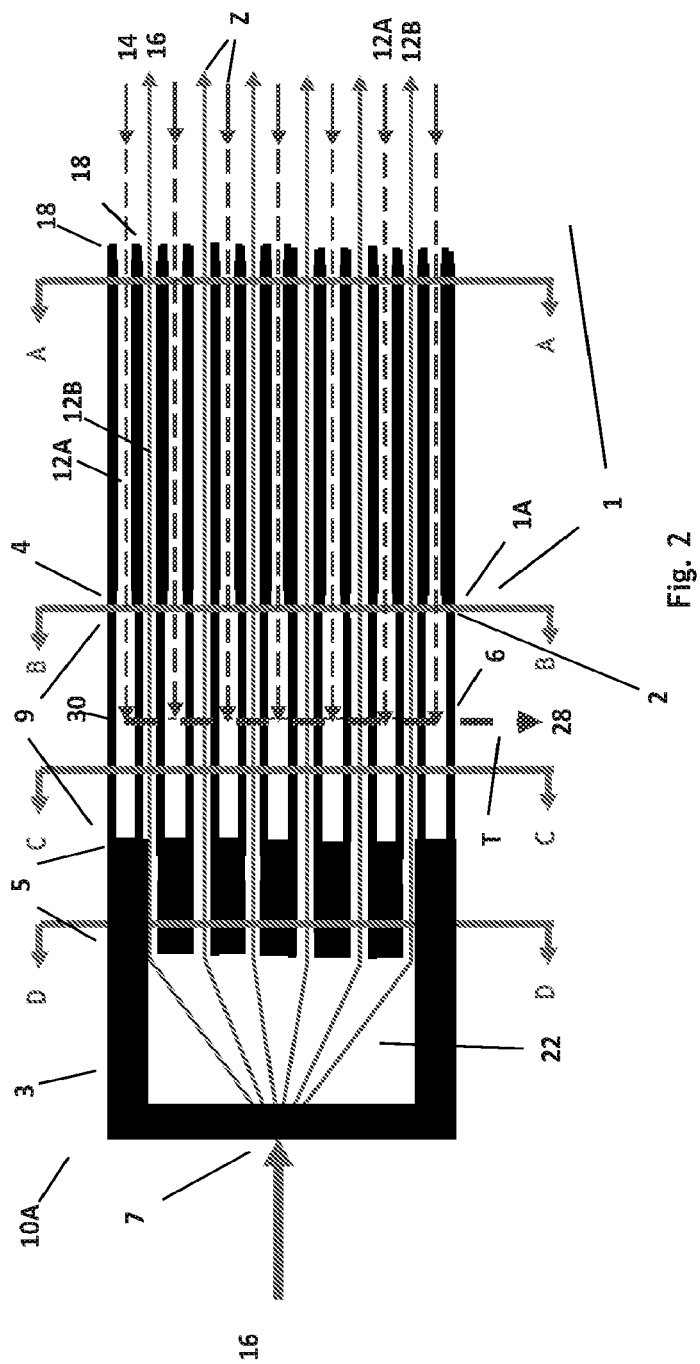
FIG. 2 is a cross-sectional illustration (i.e., medial view) of one portion of the heat exchanger of FIG. 1A.

FIG. 2 is a cross-sectional view of one-half or one end of the heat exchanger 10. (The other half of heat exchanger 10 not shown is its mirror image.) The cross-sectional view is take along the medial plane to show various flow paths therethrough. In particular, heat exchanger 10 includes channel bundle 1, where channels 12A, 12B conduct opposing streams 14, 16 (respectively). Channels 12A and 12B are constrained within walls 18 so that they flow only in one axial direction (Z)—the longitudinal axis of the exchanger 10. At an end 1A of the channel bundle 1, is positioned one of the two headers 2. Within the headers 2 stream 14 is unconfined by channels 12A and is free to flow in a transverse direction (T) in plenum area 9 toward side ports 6. Stream 16 however is confined in channels 12B and thus is still separate from stream 14 within the plenum area 9. Following the header 2 is one of the two end caps 3. Opposing stream 16 is injected into heat exchanger 10 through axial port 7 within end cap 3 and into a collection zone 22 to be fed into channels 12B to carry the opposing stream 16 axially through channel bundle 1 and on through the axial port (not shown) at the other end of heat exchanger 10. Thus, as shown in FIGS. 1A, 1B, and 2, channel bundle 1 has two sets of longitudinally extending channels 12A and 12B for the transportation and separation of two fluids 14 and 16. Channel bundle 1 extends between two terminal planes 4 (FIG. 1B shows both terminal planes, whereas the view shown in FIG. 2 is limited to just a single terminal plane 4). Extending from the end 1A of the channel bundle 1 is the header 2, where stream 14 flows into the plenum 9 and out port 6. (In the mirror half of the heat exchanger 10 not shown, port 6 is an inlet instead of an outlet for stream 14). To maintain separation of the two streams, channels 12B extend through the header 2 past a separator plate 5 and into the end cap. Fluid 16, which is transported in channels 12B enters the heat exchanger 10 through port 7 in end cap 3. The fluid 16 is contained within the collection zone 22 for the distribution of stream 16 into channels 12B (for this end 10A of the heat exchanger). In end 10B, not shown in FIG. 2, fluid 16 passes through channels 12B and empties into collection zone 22 prior to exiting the device through outlet 7. Channels 12A and 12B are arranged within heat exchanger 10 to create a checkerboard pattern. That is, channels 12A and 12B do not only alternate type of channel (e.g., 12A or 12B) vertically along the transverse direction (T) as shown in FIG. 2, but also horizontally, such that each channel within an interior of the bundle is surrounded on four sides by a channel of the opposite type to create a checkerboard pattern.

A discriminating feature of this heat exchanger design is that every channel for each set of half checkerboard receives its own fluid that does not mix with the flow from an adjacent channel. In conventional shell-and-tube heat exchangers, one or more horizontal baffles may serve to delineate separate compartments of shell-side flow—usually for the purpose of reversing flow of the shell-side between compartments—but not for the purpose of ensuring single-pass axial counter-current flow.

Below are definitions of terms used herein to describe the invention:

Checkerboard—a pattern in which zones of opposite characteristics, such as fluid properties, exist side-by-side in four directions—laterally on both sides, above and below—in the same way as the colors of a checkerboard game table are arrayed.

Half-checkerboard—just one of the two complementary patterns that make up the full checkerboard pattern.

Channel bundle—a collection of channels, arrayed in a checkerboard pattern.

Header—a zone within which the opposing fluids are distributed separately to the channels of one half-checkerboard pattern or the other. It is composed of two distinct spaces that are impervious to each other.

Separator plate—a wall, penetrable only by a set of channels dedicated to one of the two half-checkerboard patterns. It is analogous to the "tube sheet" of conventional shell-and-tube heat-exchanger designs.

Areal density—the ratio of total internal surface area of channels of the smaller cross-sectional perimeter of the two channel patterns, to the total outside volume dimension of the channel bundle, expressed as square meters per cubic meters.

Plenum—a space that is open to more than one channel. It can be used as a distribution point for fluid entering or exiting channels. For purposes of this disclosure, the plenum is the space directly adjacent to the channel bundle that distributes fluid that enters or exits the heat exchange transverse to a longitudinal axis of the channel bundle.

As noted above FIG. 2 shows in cross-section one end of the heat exchanger (end 10A), including one of the two end caps 3, one of the two separation plates 5, one of the two plenums 6 and a portion of the channel bundle 1. The countercurrent flow of opposing streams 14, 16 is represented by the opposing arrows running through channels 12A, 12B from right-to-left and from left-to-right (respectively). Only one vertical plane of channels 12A, 12B is represented in FIG. 2. FIGS. 3A, 3B, 3C, and 3D are provided to show cross-sections containing both the vertical and horizontal planes along different locations along the longitudinal axis of the heat exchanger 10. For demonstration purposes, FIGS. 3A-3D show an embodiment which includes an 5×5 array of channels of the 12B type. It is understood that there is no theoretical limit to the number of channels 12A and 12B, nor is the pattern limited to identical squares as shown. There could be hundreds or thousands, limited only by the capacity of fabrication machinery. In FIGS. 3A-D walls 18 between channels 12A, 12B are shown in black. Open areas 24 are in white. The purpose of FIGS. 2 and 3A-D is to show the means of keeping the opposing streams 14, 16 separate.

Figure 3A:
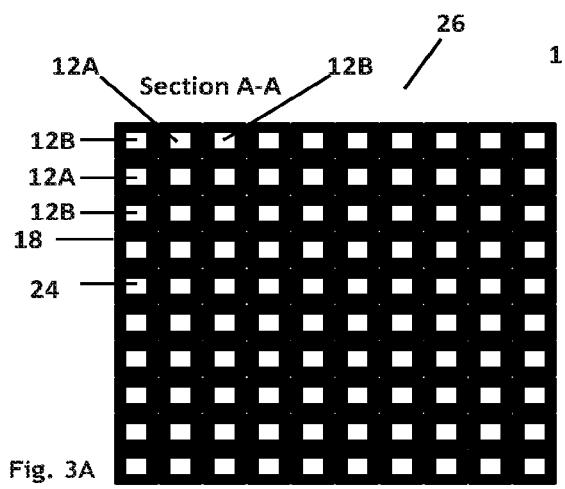
FIGS. 3A, 3B, 3C, and 3D are cross-sectional views taken along lines A-A, B-B, C-C, and D-D of FIG. 2, respectively.

In particular, Sect. A-A of FIG. 2 is shown in FIG. 3A and illustrates an embodiment of a channel array 26 as it exists within channel bundle 1. Individual channels 12A are shown as square, although they could be round, oval, trapezoidal, or half-moon-shaped, as well as filleted inside. Opposing channels 12B are of a complementary shape and are disposed about channels 12A in four directions (above, below, and on either side) to form the checkerboard pattern.

Figure 3B:
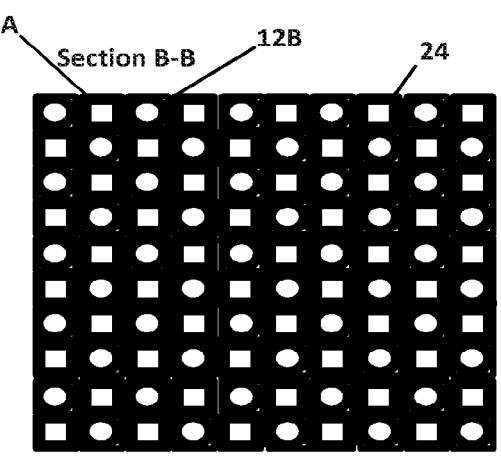
Figure 3C:
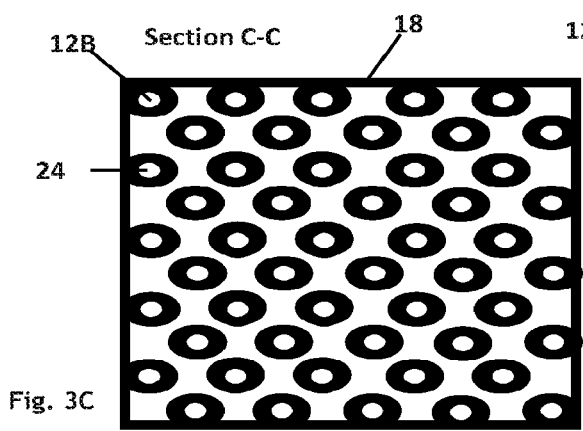
Figure 3D:
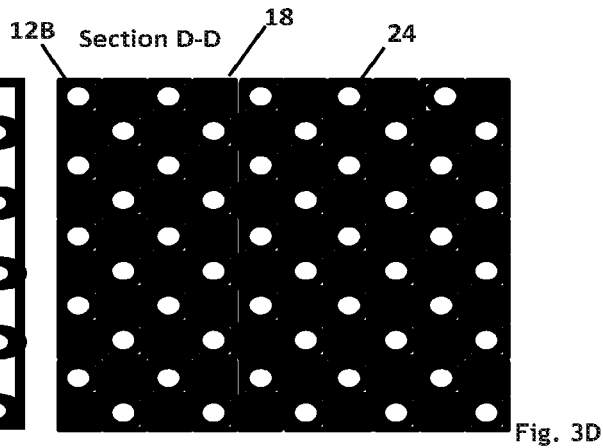
Figure 4B:
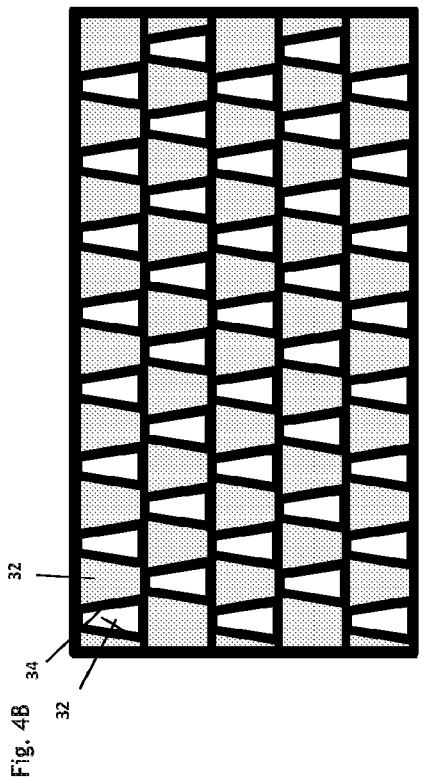
Figure 4D:
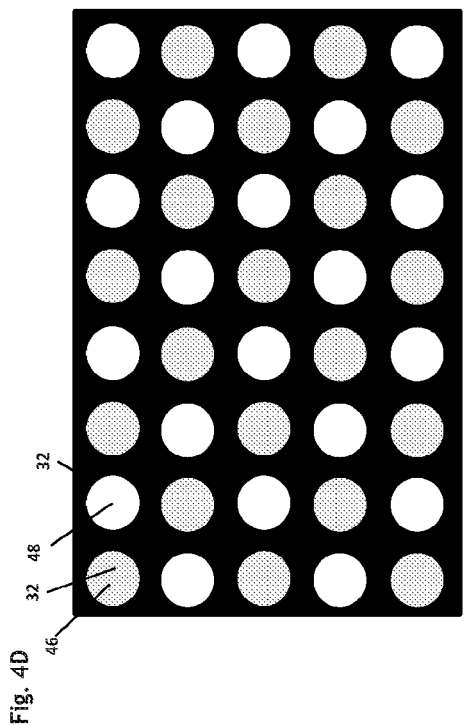
Figure 4A:
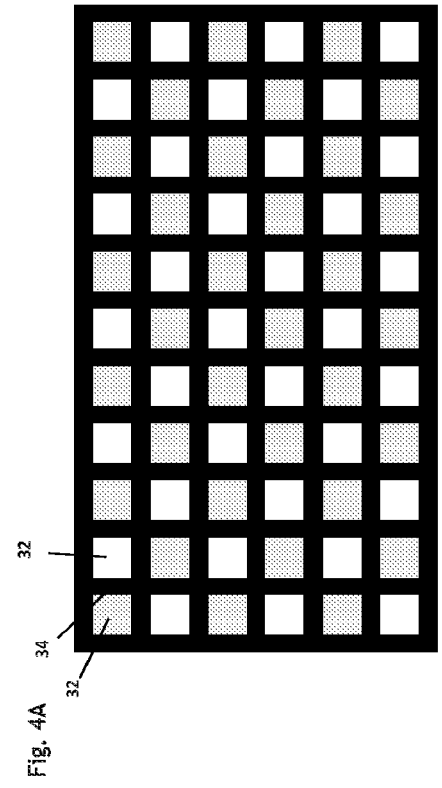
Figure 4C:
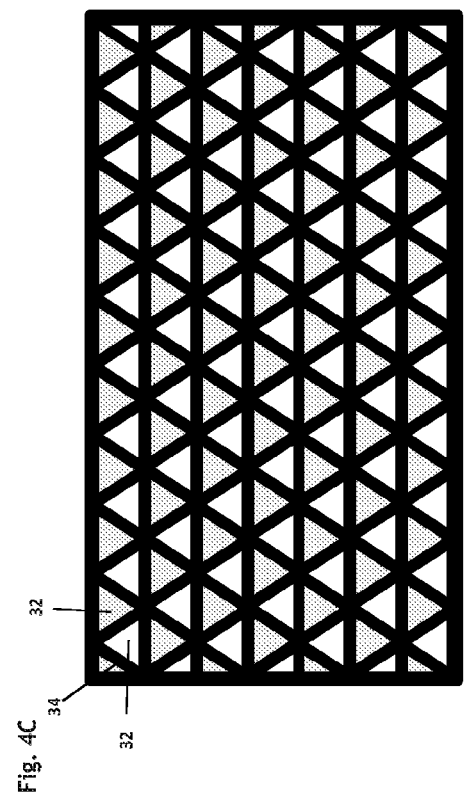

The termination of channel bundle 1 occurs at the terminal plane 4, shown as Sect. B-B in FIG. 2 and represented in cross-sectional view as FIG. 3B. At this point, channels 12A end abruptly and are open to plenum area 9 of the header 2. Inside the plenum area 9 there exist unobstructed spaces 24 between the continuation of channels 12B that confine the opposing stream 16 while streams 14 from the multitude of channels 12A can comingle and mix to form plenum fluid 28. Channels 12B extend through plenum area 9 to separator plate 5. An important requirement of the continuing channels 12B is that they do not join together or coalesce, so as to permit flow of plenum fluid 28 between the continuing channels 12B and through plenum area 9 to side ports 6. Plenum fluid 28 (i.e., collected fluid 14 from channels 12A) finds its way to or from ports 6 through this labyrinth of continuous channels 12B. (See also FIGS. 3C and 3E. FIG. 3C is a cross-section taken along line C-C in FIG. 2 and depicts a portion of the plenum area. FIG. 3E provides an enlarged view of FIG. 3C to illustrate the flow path of the plenum fluid 28.) For this reason, the contour of the continuing channels 12B might change to circular, oval or some other shape in the segment that runs through the plenum area 9, if it is not already so. It might also change to a smaller area while maintaining the same basic contour. Or, it might do both-shrink in size and change in shape. Any of these modifications is for the purpose of ensuring free space completely around confining channels 12B, such that the other opposing stream 14 is free to flow into the plenum area 9 and between the confining channels 12B of the stream 16 to or from ports 6 that are in plenum wall 30. This is shown in FIG. 3B, where channels 12A of stream 14 that terminate at this plane are shown in square shape, while the continuing channels 12B of stream 16 are round. The contour of the continuing channels 12B remains round or ovate through the plenum area 9, as shown in FIG. 3C (a cross-section taken along line C-C in FIG. 2), and through the separator plate 5, as shown in FIG. 3D (a cross-section taken along line D-D in FIG. 2). An end cap 3, comprising an axial port 7 and enclosing an open chamber, collection zone 22, through which fluid flows from or into channels 12B. Additional containment measures, including a vessel that encloses this device (not shown), may be used to hold pressure around the entire body of heat exchanger 10.

In the above embodiments of heat exchanger 10, flow paths of streams 14 and 16 have been described as either entering and exiting the exchanger through one of ports 6 or 7. For example, stream 14 has been described as entering the heat exchanger device through port 6 in end 10B (see FIG. 1A) and exiting the exchanger 10 through port 6 in end 10A (in a direction transverse to the longitudinal axis), whereas stream 16 enters the exchanger 10 through port 7 in end 10A and exits through port 7 in end 10B (in a direction parallel to the longitudinal axis). However, other embodiments are possible. For example, it may be preferable to include an transverse and parallel component to inlet/outlet flow for each stream. For example, in some embodiments, stream 14 enters the exchanger 10 through port 7 on end 10B, flow through the plurality of channels 12A and exit through port 6 on end 10A, while stream 16 enters the exchanger 10 through port 7 on end 10A, flow through the plurality of channels 12B, and exit through port 6 on end 10B. In this embodiment, the plurality of channels 12A and 12B in the bundle would be fluidly connected to their respective port to allow for fluid inlet and outlet flow. That is, channels 12A would extend from end cap 3 in end 10B, through header 2 in end 10B, through the bundle 1, and be fluidly connected to the fluid receiving area/plenum area 9 of header 2 in end 10A. Similarly, in this embodiment, channels 12B would extend from end cap 3 in end 10A, through header 2 in end 10A, through the bundle 1, and be fluidly connected to the fluid receiving area/plenum area 9 of header 2 in end 10B.

Various configurations of channel bundles that fall within the scope and definition of a checkerboard pattern are described in FIGS. 4A-D. Some of the patterns described herein may not look like checkerboards at first glance.

FIGS. 4A-D show contiguous channels 32, meaning that adjacent channels share the same walls 34. Contiguous channels 32 can be either circular, triangular or quadrilateral (including trapezoidal). Opposing channels are shaded differently in the figures so as to highlight the checkerboard flow pattern. In the case of quadrilateral channel (FIG. 4A, 4B), the presence of opposing channel on four sides, laterally on either side, above and below, is reasonably obvious. In the case of triangular channels (FIG. 4C), the pattern is clear if one imagines that one of the four sides of an otherwise quadrilateral shape shrinks to a point. In the case of circular channels (FIG. 4D), even though channels 46 (containing a first stream) and channels 48 (containing a second separate stream) have a circular perimeter, heat transfer happens throughout the entire perimeter and thus four sides or portions corresponding to the four sides are provided.

Figure 5:
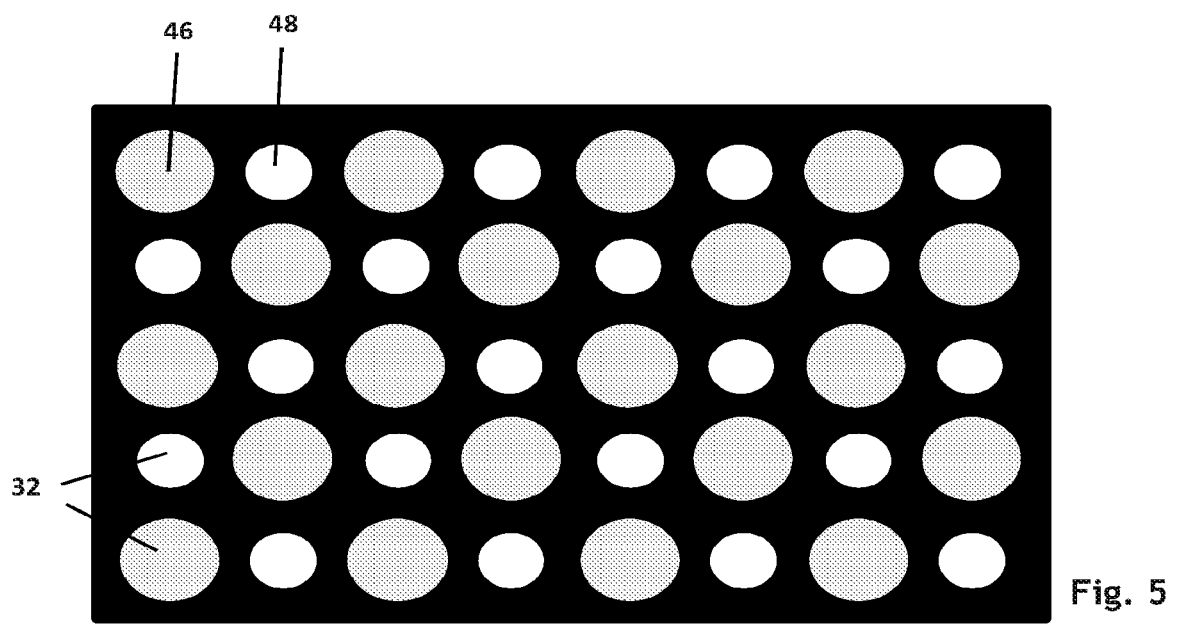
FIG. 5 illustrates another embodiment of a checkerboard pattern of channels. In the embodiment illustrated in FIG. 5, channels forming one set within the checkerboard have a cross-sectional shape that is similar to its complementary set but the sizes of the channels in each set are different.

The contiguous channels 32 need not have the same cross-sectional area; one set of channels can be smaller than the other set of channels. FIG. 5 shows circular contiguous channels 32 that are adjacent to each other but are of different sizes. (Channels 46 containing the first stream are of a different size than channels 48 containing the second stream.) Contiguous channels 32 can be either circular, triangular or quadrilateral (including trapezoidal).

FIG. 6A and FIG. 6B show contiguous channels 32 of different shape and size. Virtually any tubular shape—circular (FIG. 6A), ovate and polygonal (FIG. 6B) to any number of sides—may be applied to one of the opposing streams 16, then assembled in layers that are separated by sheets 40. The void spaces 42 between channels 44, for example tubes, become the channels of the stream 14. The overall checkerboard pattern is evident from the differential shading applied to the channels in FIGS. 6A and 6B. In the sheet-separated channel configuration 38, some segments of the separator sheet 40 will be shared by channels of the same stream rather than the opposing stream. Such segments, however, are either very short or tend to occur at points where flow would be constrained by geometrical irregularity. In the case of tubes 44 held between separator sheets 40 (FIG. 6A) these areas are in the form of sharply pointed wedges.

For example, stream 16 can be directed through round or ovate tubes 44 (acting as channels) that may be welded to thin sheets 40 above and below, forming a sandwich of tubes 44 held between metal sheets 40. The spaces 42 between the tubes 44 can then be used to convey the other stream 14 counter-currently. In this case, void spaces 42 between tubes 44 would look something like an hourglass. The relative area of tube cross-section versus that of the hourglass cross-section is variable according to the pitch, or distance between tubes. The basic pattern of the checkerboard is retained in that each channel exists in proximity to channels of opposing flow, exchanging heat in four directions, laterally on both sides, above and below.

In an exemplary embodiment of the sheet-separated channel configuration 38, each stream, 14 and 16, would enter via a side port 6 and exit via an axial port 7 at the other end, or vice-versa. This configuration may improve pressure drop, depending on conditions of temperature, pressure and viscosity. The alternative is to have the streams 14 and 16 enter and exit via the same type of collector, be it located on the sides to handle fluid that flows transversely through a header 2, or axially at the end caps 3 of the heat exchanger 10.

In the configuration shown in FIGS. 7 and 8A-D a different header design is shown. As an alternative to the open plenum at the axial end 1A of the channel bundle 1 (as shown in FIG. 2), diagonal channels 52 are cut near the ends 1A of the channel bundles 1 such that only one set of half-checkerboard channels 46 is intersected. The end 1A of the channel bundle 1 is then capped with a plate 5 that has holes only for the complementary set of half-checkerboard channels 48 while the other set of channels 46 is redirected in a collection zone 54 within the channel bundle to a manifold 58 alongside the ends of the bundle, as illustrated in FIG. 8C. FIG. 7 describes the flow paths for the opposing streams 14, 16 in a manner analogous to FIG. 2. One difference between the two designs is that the shape of the continuing channel 12B need not change as it passes through the collection zone 6, as it does in case of contiguous channels 32, because in this case the stream 14 flowing through the side ports 60 is guided by the diagonal channels 52 that are cut within the channel bundle 1. Thus, cross-sectional views taken along lines A-A and B-B of FIG. 7 and shown as FIGS. 8A and 8B, respectively, are identical. The cross-sectional view in the collection zone 54 and manifold 58 where the diagonal guide channels 52 exist is shown in FIG. 8C (a cross-sectional view taken along line C-C in FIG. 7). The outer dimensions (X) of the heat exchanger 10 will expand somewhat to accommodate the collection zone 54 and manifold 58. This extra girth is also indicated in FIG. 7. The manifold 58, shown in FIG. 8C, directs stream 14 to port 60. Immediately following the collection zone 6 is a separator plate 72 (see FIG. 8D, which is a cross-section taken along line D-D in FIG. 7)) through which only the channels 48 of the half-checkerboard array 66 of the opposing stream 16 can penetrate or pass through. Separator plate 72 in FIG. 7 is analogous to separator plate 5 in FIG. 2. These channels 48 ultimately empty into the cavity 22 of the heat exchanger's end cap 3.

Figure 9A:
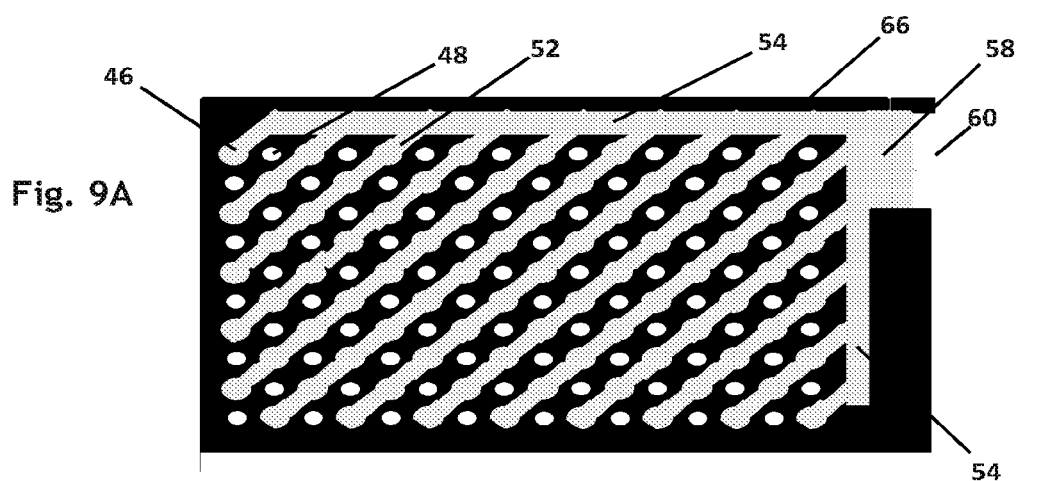
FIGS. 9A and 9B are cross-sectional views of an embodiment of a heater exchanger in accordance of the present disclosure.
Figure 9B:
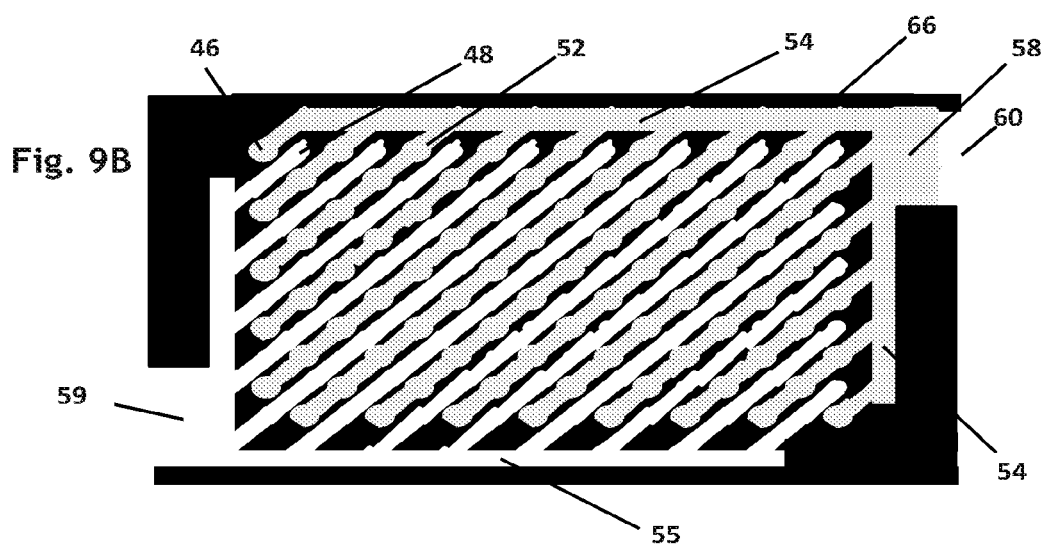

Referring to FIG. 8C, a flow pattern for the case of one stream flowing in or out of the heat exchanger in a axial direction while the other stream flows out through a side port is shown. FIG. 9A repeats this embodiment, in which one fluid stream flows to a collection zone 54 and out a port 60. FIG. 9B is an illustration of an embodiment in which both streams flow into or out from the heat exchanger via diagonal channels. The manifold flow patterns of the two streams are mirror images of each other. That is, FIG. 9B shows that a first flow stream is collected in collection zone 54 of manifold 58, in fluid communication with side port 60, while a second flow stream, separated from the first flow stream accumulates in collection zone 55 fluidly connected to side port 59.

In any of the configurations described, the present invention 10 can also be used to facilitate chemical reaction in at least one of the opposing streams 14, 16 together with simultaneous heat transfer between two streams 14, 16 in countercurrent flow, such that one of the opposing streams provides energy to the other stream. An example of such a reaction is the endothermic syngas process for producing carbon monoxide and hydrogen from methane and water. In one embodiment, a feedstock mixture would be fed to one complementary set of half-checkerboard channels (e.g., 12, FIG. 2A), while a hot fluid-perhaps a waste-heat combustion stream-flows countercurrently through the other complementary set of half-checkerboard channels (e.g., 12B, FIG. 2) so as to provide heat from the syngas reaction. Another example of a chemical reaction which can be carried out in devices (e.g., heat exchangers) of the present disclosure is the exothermic Fischer-Tropsch process for producing hydrocarbons of varying chain length from a feed mixture of carbon monoxide and hydrogen. In this embodiment, the complementary stream would absorb heat from the reaction. That is, one fluid stream (i.e., a reaction stream) would carry out the chemical reaction within the flow path (i.e., along the longitudinal axis of one set of the half-checkerboard) while the complementary set of half-checkerboard channels would contain a fluid that absorbs the heat from the reaction. Depending on the type of reaction being sought, porous catalyst material might be required to be placed in the channel that carries the reaction stream, as is the case in Fischer-Tropsch synthesis. Additionally, in an embodiment of the present invention, an endothermic reaction stream may be fed to one set of half-checkerboard channels while an exothermic reaction stream is fed through the other complementary set of half-checkerboard channels.

A heat exchanger 10 according to this disclosure can be manufactured to areal densities of greater than 400 $m^2/m^3$. Depending of the form applied, areal density can reach up to 2,000 $m^2/m^3$ and possibly higher. Such a heat exchanger exhibits superior performance over conventional shell-and-tube heat exchanger in terms of pressure drop. For the shell side of a conventional shell-and-tube heat exchanger especially, pressure drop increases rapidly as the channel size decreases. Table 1 provides data calculated for a hypothetical heat exchanger designed in accordance with an embodiment of the present invention: that is, for a hypothetical microchannel heat exchanger providing single-pass countercurrent flow and having a bundle of channels in which the channels are arranged to form the checkerboard pattern with opposing flows that are kept separate. Table 1 describes a hypothetical cases of a microchannel heater exchanger according to the present disclosure and a conventional shell-and-tube heat exchanger, both being of equal outer dimension and flow conditions. The microchannel counter-current heat exchanger, longitudinally baffled at each row, serves as a baseline case for comparison with transversely baffled shell-and-tube heat exchangers of varying tube diameters (see Table 2 below). These cases exemplify heat recuperation with opposing streams of carbon dioxide-one stream hotter than the other and at different pressure, but both at the same flow rate. The tube outside diameter of this base-case microchannel heat exchanger is 1.07 mm. The envelope is large enough to contain a bundle of 40,000 such tubes.

Table 2 compares the pressure drop of the longitudinally baffled microchannel heat exchanger of fixed tubing size (1-mm diameter) with the transversely baffled shell and tube heat exchange of varying tube sizes from 20 mm to as narrow as 1 mm in outside diameter. Because the outer dimension of the tube bundled remains fixed according to Table 1, the tube count for the shell-and-tube case decreases as the tube outside diameter increases. At about the 12-mm-OD tube size (approximately ½-inch), the shell-side pressure drop of the conventional heat exchanger is equal to the pressure drop at the "shell-side" of the hypothetical microchannel device presented in Table 1. While the pressure drop between the two exchangers may be equivalent, the areal density of the exchanger in accordance to the present disclosure and provided in Table 1, is over 5 times greater (compare 1,493 m²/m³ to 289 m²/m³). At the 1-mm size, the transversely baffled shell and tube heat exchanger (having 5 baffles) has a pressure drop that is 18 times greater than the exchanger described in Table 1 and in accordance with an embodiment of the present disclosure. (Note however, that the areal densities between the two different exchangers is substantially equivalent.) For a given shell dimension, the areal density increases as tube OD decreases. Thus as a general rule, heat exchanger 10 according to this disclosure operates with less pressure drop at areal densities of 400 m²/m³ or greater.

It is also the case that the heat duty capability of conventional shell-and-tube heat exchangers cannot match countercurrent microchannel heat exchangers 10 according to this disclosure unless the areal density is greater than 400 m²/m³ (see Table 3). Looking at it another way, a microchannel heater exchanger 10 according to this disclosure can achieve a high degree of heat duty in a compact envelope without the high pressure drop that would result from a conventional shell-and-tube design. As can be seen in Table 3, the conventional shell-and-tube heat exchanger (with 5 baffles) does not achieve equivalent heat duty performance as the microchannel heat exchanger unless the tubes are less than 4 mm in outside diameter, but at this size the shell-side pressure drop is much higher than that of the longitudinally baffled design. Therefore, conventional shell-and-tube design exchangers (i.e., including one or more transverse baffles) can not provide similar or equivalent heat duty performance while maintaining an acceptable pressure drop.

TABLE 1

Baseline specification: Longitudinally baffled microchannel heat exchanger

| Tube bundle OD | 0.33 meters |
| Tube bundle length | 1.5 meters |
| Tube OD | 1.07 Millimeter |
| Tube count | 40,000 |
| Areal density | 1,493 m²/m³ |
| Heat duty | Carbon dioxide (both sides) |
| Flow rate | 15 kg/s (both sides) |
| Heat duty | 2,783 kW |

| | | |
|---|---|---|
| Tube side | Inlet | 200.0 C. |
| | | 285.0 Bar |
| | Outlet | 336.0 C. |
| | | 284.8 Bar |
| Tube side pressure drop: | | 0.2 Bar |
| Shell side | Inlet | 450.0 C. |
| | | 115.0 Bar |
| | Outlet | 292.1 C. |
| | | 114.7 Bar |
| Shell side pressure drop: | | 0.3 Bar |

TABLE 2

Comparative performance: Pressure drop
40,000-tube Baseline horizontally baffled microchannel HX (A)
versus Transversely baffled shell-and-tube HX (B) of varying tube size

| HX B: | | | Shell side | | Tube side | |
|---|---|---|---|---|---|---|
| Tube OD mm | Tube count | Areal density m²/m³ | Press. drop, bar | Times baseline microHX | Press. drop, bar | Times Baseline microHX |
| 1 | 41,660 | 1,500 | 5.38 | 17.93 | 0.57 | 2.85 |
| 2 | 10,420 | 750 | 2.36 | 7.87 | 0.27 | 1.35 |
| 3 | 4,630 | 500 | 1.46 | 4.87 | 0.18 | 0.90 |
| 4 | 2,610 | 376 | 1.04 | 3.47 | 0.13 | 0.65 |
| 5 | 1,670 | 301 | 0.80 | 2.67 | 0.11 | 0.55 |

TABLE 2-continued

Comparative performance: Pressure drop
40,000-tube Baseline horizontally baffled microchannel HX (A)
versus Transversely baffled shell-and-tube HX (B) of varying tube size

| HX B: | | | Shell side | | Tube side | |
|---|---|---|---|---|---|---|
| Tube OD mm | Tube count | Areal density m²/m³ | Press. drop, bar | Times baseline microHX | Press. drop, bar | Times Baseline microHX |
| 6 | 1,160 | 251 | 0.65 | 2.17 | 0.10 | 0.50 |
| 7 | 860 | 217 | 0.55 | 1.83 | 0.08 | 0.40 |
| 8 | 660 | 190 | 0.47 | 1.57 | 0.08 | 0.40 |
| 9 | 520 | 168 | 0.41 | 1.37 | 0.07 | 0.35 |
| 10 | 417 | 150 | 0.37 | 1.23 | 0.07 | 0.35 |
| 11 | 344 | 136 | 0.33 | 1.10 | 0.06 | 0.30 |
| 12 | 289 | 125 | 0.30 | 1.00 | 0.06 | 0.30 |
| 13 | 246 | 115 | 0.27 | 0.90 | 0.06 | 0.30 |
| 14 | 213 | 107 | 0.25 | 0.83 | 0.06 | 0.30 |
| 15 | 185 | 100 | 0.23 | 0.77 | 0.05 | 0.25 |
| 16 | 163 | 94 | 0.22 | 0.73 | 0.05 | 0.25 |
| 17 | 144 | 88 | 0.20 | 0.67 | 0.05 | 0.25 |
| 18 | 129 | 84 | 0.19 | 0.63 | 0.05 | 0.25 |
| 19 | 115 | 79 | 0.18 | 0.60 | 0.05 | 0.25 |
| 20 | 104 | 75 | 0.17 | 0.57 | 0.05 | 0.25 |

A base line of under 1.00 (e.g., see above lines) denotes comparative underperformance by transversely baffled shell-and tube heat exchanger

TABLE 3

Comparative performance: Heat exchange duty
40,000-tube Baseline longitudinally baffled microchannel HX (A)
versus Transversely baffled shell-and-tube HX (B) of varying tube size

| HX B: | | | | |
|---|---|---|---|---|
| Tube OD mm | Tube count | Areal density m²/m³ | Heat duty, kW | Times baseline microHX |
| 1 | 41660 | 1,500 | 2,787 | 1.00 |
| 2 | 10420 | 750 | 2,786 | 1.00 |
| 3 | 4630 | 500 | 2,766 | 0.99 |
| 4 | 2610 | 376 | 2,693 | 0.97 |
| 5 | 1670 | 301 | 2,569 | 0.92 |
| 6 | 1160 | 251 | 2,418 | 0.87 |
| 7 | 860 | 217 | 2,263 | 0.81 |
| 8 | 660 | 190 | 2,108 | 0.76 |
| 9 | 520 | 168 | 1,959 | 0.70 |
| 10 | 417 | 150 | 1,815 | 0.65 |
| 11 | 344 | 136 | 1,688 | 0.61 |
| 12 | 289 | 125 | 1,574 | 0.57 |
| 13 | 246 | 115 | 1,470 | 0.53 |
| 14 | 213 | 107 | 1,379 | 0.50 |
| 15 | 185 | 100 | 1,292 | 0.46 |
| 16 | 163 | 94 | 1,216 | 0.44 |
| 17 | 144 | 88 | 1,144 | 0.41 |
| 18 | 129 | 84 | 1,083 | 0.39 |
| 19 | 115 | 79 | 1,020 | 0.37 |
| 20 | 104 | 75 | 998 | 0.36 |

Area below the line denotes comparative under-performance by transversely baffled heat exchanger Example 1

A heat exchanger as shown in FIG. 1 was fabricated according to the contiguous channel configuration, comprising an array of 25×25 square channels, each 0.6-mm inside height and width, occupying an outside dimension of 1-in by 1-in. The size and shape of the channels (see FIG. 2, 12A) for holding a first stream (14) are substantially the same along the longitudinal axis (z). The size and shape of the channels (12B) are altered as shown in FIGS. 3B-3D. The heat exchanger was additively manufactured. In particular, Inconel 718 was used to form the channels (both 12A and 12B). The total length of the bundle was 6.57 inches. Total internal surface area for one of the two countercurrent streams is 0.1202 m². Overall areal density (surface area divided by overall volume) is thus 1,116 m²/m³. In a test with water flowing at rates of 0.38 to 1.08 gallons per minute (see Table 4), the power density ranged from 25.1 to 32.4 MW/m³.

TABLE 4

Heat duty: Tests with water
25 × 25 channels, 1" × 1" × 6.57" outer dimensions

| Case | Stream | Flowrate [GPM] | Inlet [F.] | Outlet [F.] | Heat duty [kW] | Power density MW/m³ |
|---|---|---|---|---|---|---|
| A1 | Hot Side | 1.08 | 91.4 | 73.2 | −2.9 | 26.8 |
|    | Cold Side | 1.08 | 60.8 | 79.1 | 2.88 |  |
| B1 | Hot Side | 0.48 | 124.4 | 85.9 | −2.71 | 25.1 |
|    | Cold Side | 0.48 | 64.4 | 102.7 | 2.7 |  |
| C1 | Hot Side | 0.9 | 96.1 | 74.4 | −2.86 | 26.6 |
|    | Cold Side | 0.9 | 60.1 | 81.8 | 2.86 |  |
| D1 | Hot Side | 0.67 | 110.7 | 79.3 | −3.09 | 28.6 |
|    | Cold Side | 0.67 | 60.3 | 91.6 | 3.08 |  |
| E1 | Hot Side | 0.29 | 180.4 | 98 | −3.5 | 32.4 |
|    | Cold Side | 0.29 | 62.4 | 144.1 | 3.47 |  |
| F1 | Hot Side | 0.38 | 148.4 | 93.8 | −3.04 | 28.1 |
|    | Cold Side | 0.38 | 66.7 | 120.9 | 3.02 |  |

Example 2

A stainless steel microchannel heat exchanger constructed in accordance with the present disclosure, and having an areal density of 1,351 m2/m3 in a bundle volume of 65.7 cubic inches, weighing 8.5 lbs., was tested under the conditions described in Table 5. Power density for these cases is in the range of 10 to 11 MW/m³.

TABLE 5

Heat duty: Tests with carbon dioxide
32 × 20 channels, 1.04" × 2.155" × 29.43" outer dimensions

| Case | Stream | Flowrate [GPM] | Inlet [F.] | Outlet [F.] | Heat duty [kW] | Power density MW/m³ |
|---|---|---|---|---|---|---|
| A2 | Hot Side | 3.45 | 175.6 | 97.0 | −10.8 | 10.1 |
|    | Cold Side | 2.22 | 77.8 | 112.9 | 11.1 |  |
| B2 | Hot Side | 3.37 | 178.9 | 97.3 | −10.9 | 10.0 |
|    | Cold Side | 2.19 | 79.7 | 115.4 | 10.7 |  |
| C2 | Hot Side | 6.87 | 167.4 | 101.5 | −12.1 | 11.2 |
|    | Cold Side | 2.23 | 83.3 | 142.5 | 12.1 |  |

While the disclosure has been described in detail and with reference to specific embodiments thereof, it will be apparent to one skilled in the art that various changes and modifications can be made therein without departing from the spirit and scope of the embodiments. Thus, it is intended that the present disclosure cover the modifications and variations of this disclosure provided they come within the scope of the appended claims and their equivalents.

What is claimed is:

1. A device including channels arranged for countercurrent flow comprising:
   a bundle of channels comprising a first plurality of channels and a second plurality of channels configured to flow fluids counter-currently in opposite directions whereby opposing streams of fluid are arranged in a checkerboard pattern, such that for any given channel there exist alongside, in four directions, laterally on both sides, above and below, channels containing the opposite fluid;
   wherein the second plurality of channels confines one of the opposing streams through a plenum area at either end of the bundle, and extends into a cavity through which fluid enters or exits the device by second flow-stream ports in a wall of the cavity; and
   wherein the second plurality of channels that penetrates the plenum area may be altered in size or shape, or both size and shape, so as to ensure free space completely around the second plurality of channels, such that fluid is free to flow between the second plurality of channels to or from first flowstream ports.

2. The device of claim 1 wherein the areal density of the bundle of channels is greater than 400 m²/m³.

3. The device of claim 1 wherein a heat transfer coefficient is enhanced by means of structural changes in walls of the individual channels, leading to increased turbulence in the flowing stream.

4. The device of claim 1 wherein a cross-sectional shape of individual channels in the first plurality of channels is a hollow polygon of no more than four sides, while a cross-sectional shape of the second plurality of channels takes the form of any shape and size, including the voids created between the walls of the first plurality of channels.

5. The device of claim 1 wherein the checkerboard pattern is formed by alternating layers of sheets and rows of tubes, said tubes of which may be round, ovate or polygonal in cross section and separated laterally by void spaces, while sheets positioned above and below these rows separate them vertically, such that alternating layers of tubes are staggered.

6. The device of claim 1 wherein a manifold at one or both ends is formed by means of obstructing axial flow of a first set of complementary channels in half-checkerboard pattern and redirecting it in the transverse direction via channels that pass diagonally between the channels of a second set of complementary channels in half-checkerboard pattern, such that flow from the first set converges to side ports alongside the ends of the channel bundle.

7. A method of heat transfer between a first fluid stream and a second fluid stream in a countercurrent single pass heat exchanger, the method comprising:
   flowing the first fluid stream and the second fluid stream in a bundle of channels such that the first and second fluid streams flow countercurrently to each other to exchange heat within an interior region of the bundle along a longitudinal axis of the bundle in four directions with respect to an individual channel without mixing the first and second fluid streams, the four directions comprising above the individual channel, below the individual channel, and along at least a portion of each lateral side of the individual channel;
   collecting the first fluid stream in a first fluid receiving member the second fluid stream being confined within a plurality of channels extending through a plenum area of the first fluid receiving member to separate the first and second fluid streams, wherein the plurality of channels may be altered in size or shape, or both size and shape, so as to ensure free space completely around the plurality of channels such that fluid is free to flow between the plurality of channels to or from a flow-stream port; and
   collecting the second fluid stream in a second fluid receiving member.

8. The method of claim 7 further comprising:
increasing flow turbulence of the first fluid stream such that a heat transfer coefficient of the first flow stream is modified to a value which is within one order of magnitude of a heat transfer coefficient value of the second fluid stream.

9. The method of claim 7, wherein a chemical reaction occurs in the first fluid stream and the second fluid stream either absorbs energy therefrom or provides thermal energy to the first fluid stream.

* * * * *